United States Patent
Kaul et al.

(10) Patent No.: US 12,399,982 B2
(45) Date of Patent: Aug. 26, 2025

(54) DIGITAL CONTENT MANAGEMENT THROUGH ON-DIE CRYPTOGRAPHY AND REMOTE ATTESTATION

(71) Applicant: Lockheed Martin Corporation, Bethesda, MD (US)

(72) Inventors: Jason Todd Kaul, Longwood, FL (US); Scott Edwin Hinnershitz, Oviedo, FL (US); David Jose Lopez, Windermere, FL (US); Nhan Huu Mai, Winter Garden, FL (US); Eric Allen Momper, Orlando, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 207 days.

(21) Appl. No.: 18/255,529

(22) PCT Filed: Dec. 1, 2021

(86) PCT No.: PCT/US2021/061429
§ 371 (c)(1),
(2) Date: Jun. 1, 2023

(87) PCT Pub. No.: WO2022/119935
PCT Pub. Date: Jun. 9, 2022

(65) Prior Publication Data
US 2024/0037217 A1     Feb. 1, 2024

Related U.S. Application Data

(60) Provisional application No. 63/119,868, filed on Dec. 1, 2020.

(51) Int. Cl.
*G06F 21/60*     (2013.01)
*G06F 21/53*     (2013.01)
(Continued)

(52) U.S. Cl.
CPC ............ *G06F 21/53* (2013.01); *G06F 21/575* (2013.01); *G06F 21/602* (2013.01); *H04L 9/0825* (2013.01); *H04L 9/0894* (2013.01)

(58) Field of Classification Search
CPC ...... G06F 21/53; G06F 21/575; G06F 21/602; G06F 21/12; H04L 9/0825; H04L 9/0894;
(Continued)

(56) References Cited

U.S. PATENT DOCUMENTS 9,009,854 B2     4/2015 Chhabra et al.
11,469,904 B1 *  10/2022 Kats ..................... G06F 21/602
(Continued)

OTHER PUBLICATIONS

International Search Report and Written Opinion for international application No. PCT/2021/061429. Date of mailing Jul. 12, 2022. (20 pgs).

(Continued)

*Primary Examiner* — Izunna Okeke
(74) *Attorney, Agent, or Firm* — Finnegan, Henderson, Farabow, Garrett & Dunner LLP

(57) ABSTRACT

A system for digital rights management including a processor in a platform and a memory device comprising instructions that when executed configure the processor to perform operations. The operations may include determining whether a digital media is locally installed in a platform before initiating an operating system, and launching a first UEFI application configured to generate attestation data and communicate attestation based data to a server through an encrypted medium in response to determining the digital media is not installed. The operations may also include receive a binary file of the digital media and a first decryption key and performing a sealing of the binary file using a sealing enclave of the first UEFI application and generating a local decryption second key based on the first key and local (Continued)

entropy. The operations may also include installing the sealed binary file on local storage.

16 Claims, 9 Drawing Sheets

(51) Int. Cl.
    *G06F 21/57*     (2013.01)
    *H04L 9/08*     (2006.01)

(58) Field of Classification Search
    CPC ..... H04L 9/321; H04L 9/3271; H04L 63/166; H04L 2209/60; H04N 21/4627
    See application file for complete search history.

(56) References Cited

U.S. PATENT DOCUMENTS

| | | | |
|---|---|---|---|
| 2014/0380425 | A1 | 12/2014 | Lockett et al. |
| 2015/0163229 | A1* | 6/2015 | Lindteigen ............ H04L 9/0618 |
| | | | 713/155 |
| 2016/0182465 | A1 | 6/2016 | Lam et al. |
| 2016/0350534 | A1* | 12/2016 | Poornachandran ... G06F 21/554 |
| 2019/0028281 | A1* | 1/2019 | Turissini ................. G06F 21/57 |
| 2020/0220713 | A1 | 7/2020 | Li |
| 2020/0304299 | A1 | 9/2020 | Medvinsky |

OTHER PUBLICATIONS

Extended European Search Report, European Application No. 21901393.5, dated Sep. 25, 2024. (9 pgs).

* cited by examiner

DIGITAL CONTENT MANAGEMENT THROUGH ON-DIE CRYPTOGRAPHY AND REMOTE ATTESTATION

CROSS REFERENCE TO RELATED APPLICATIONS

This application is a National Stage Entry of International Application No PCT/US2021/061429, filed Dec. 1, 2021, which is based on and claims the benefit of priority of U.S. Provisional Patent Application No. 63/119,868, filed on Dec. 1, 2020. The foregoing applications are incorporated herein by reference in their entireties.

TECHNICAL FIELD

The present disclosure generally relates to computerized systems and methods for digital content management through on-die cryptography and remote attestation. Embodiments of the present disclosure relate to systems and methods for firmware-based digital rights management using Unified Extensible Firmware Interface (UEFI) applications and cryptographic entropy unique to the platform's hardware.

BACKGROUND

Digital media can be easily duplicated and distributed. For instance, digital files can be copied an unlimited number of times without degradation, and the digital copies can be distributed broadly, easily, and quickly through online file-sharing tools. It is difficult to protect the distribution and reproduction of digital material or content, which is frequently pirated, improperly used, and/or manipulated without the owner's permission. The intrinsic reproducibility of digital media creates a challenging landscape for digital content creators that must balance carefully securing their product while making it available to consumers.

Several verification technologies have been developed to control the distribution and reproduction of digital media. For example, content producers have secured distribution of their work with product keys, which require inputting serial numbers or codes during installation of the digital content. Other verification technologies are based on authentication servers used to limit the number of concurrently running copies (e.g., limited install activations) and/or require periodic authentication of users (e.g., persistent online authentication). Yet, other verification technologies employ encryption of the digital content or restrict the digital content, using for example, anti-tampering methods, watermarks, and/or lockout lists.

These technologies for managing and securing digital content, however, are vulnerable to attacks and/or become inconvenient to both users and content creators. For example, product keys have been breached when they are published and/or leaked. Further, authentication servers have been attacked to either remove restrictions and/or lockout legitimate users (e.g., through DDOS attacks). Other technologies, such as encryption or regional lock-outs, place heavy burdens on content providers and users, undermining usability or user friendliness. For example, some digital media restrictions lock digital media in single devices, preventing portability or platform independence. Moreover, some content providers find it too cumbersome to create, maintain, secure, and guarantee servers used for authentication or trusted platform modules (TPMs). Additionally, authentication servers may be tricked when operating systems are hacked or tampered.

The disclosed systems and methods address one or more of the problems set forth above and/or other known problems in the field.

SUMMARY

One aspect of the present disclosure is directed to a system for digital rights management including at least one processor in a platform and at least one memory device comprising instructions that when executed configure the at least one processor to perform operations. The operations may include before initiating an operating system of the at least one processor, determining whether a digital media is locally installed in a platform; in response to determining the digital media is not locally installed, launching a first UEFI application configured to generate attestation data in an attestation enclave and communicate attestation based data to a server through an encrypted medium; and receiving, from the server and through the encrypted medium, a binary file of the digital media and a first decryption key. The operations may also include performing a sealing of the binary file using a sealing enclave of the first UEFI application and generating a local decryption second key based on the first key and local entropy (the second key being unique to the platform) and installing the sealed binary file on local storage of the platform.

Another aspect of the present disclosure is directed to a method for digital rights management. The method may include determining whether a digital media is locally installed in the platform before initiating an operating system of a processor in a platform, and (in response to determining the digital media is not locally installed) launching a first UEFI application configured to generate attestation data in an attestation enclave and communicate attestation based data to a server through an encrypted medium. The method may also include receiving (from the server and through the encrypted medium) a binary file of the digital media and a first decryption key. The method may also include performing a sealing of the binary file using a sealing enclave of the first UEFI application and generating a local decryption second key based on the first key and local entropy (the second key being unique to the platform), and installing the sealed binary file on local storage of the platform.

Yet another aspect of the present disclosure is directed to an apparatus including one or more processors and one or more memory devices storing instructions that configure the one or more processors to: before initiating an operating system of the apparatus, determine whether a digital media is locally installed in the apparatus and in response to determining the digital media is not locally installed, launch a first UEFI application configured to generate attestation data in an attestation enclave and communicate attestation based data to a server through an encrypted medium. The instructions may also configure the apparatus to receive (from the server and through the encrypted medium) a binary file of the digital media and a first decryption key. Further, the instructions may also configure the processors to perform a sealing of the binary file using a sealing enclave of the first UEFI application and generating a local decryption second key based on the first key and local entropy (the second key being unique to the platform) and install the sealed binary file on local storage of the platform.

DETAILED DESCRIPTION

Figure 1:
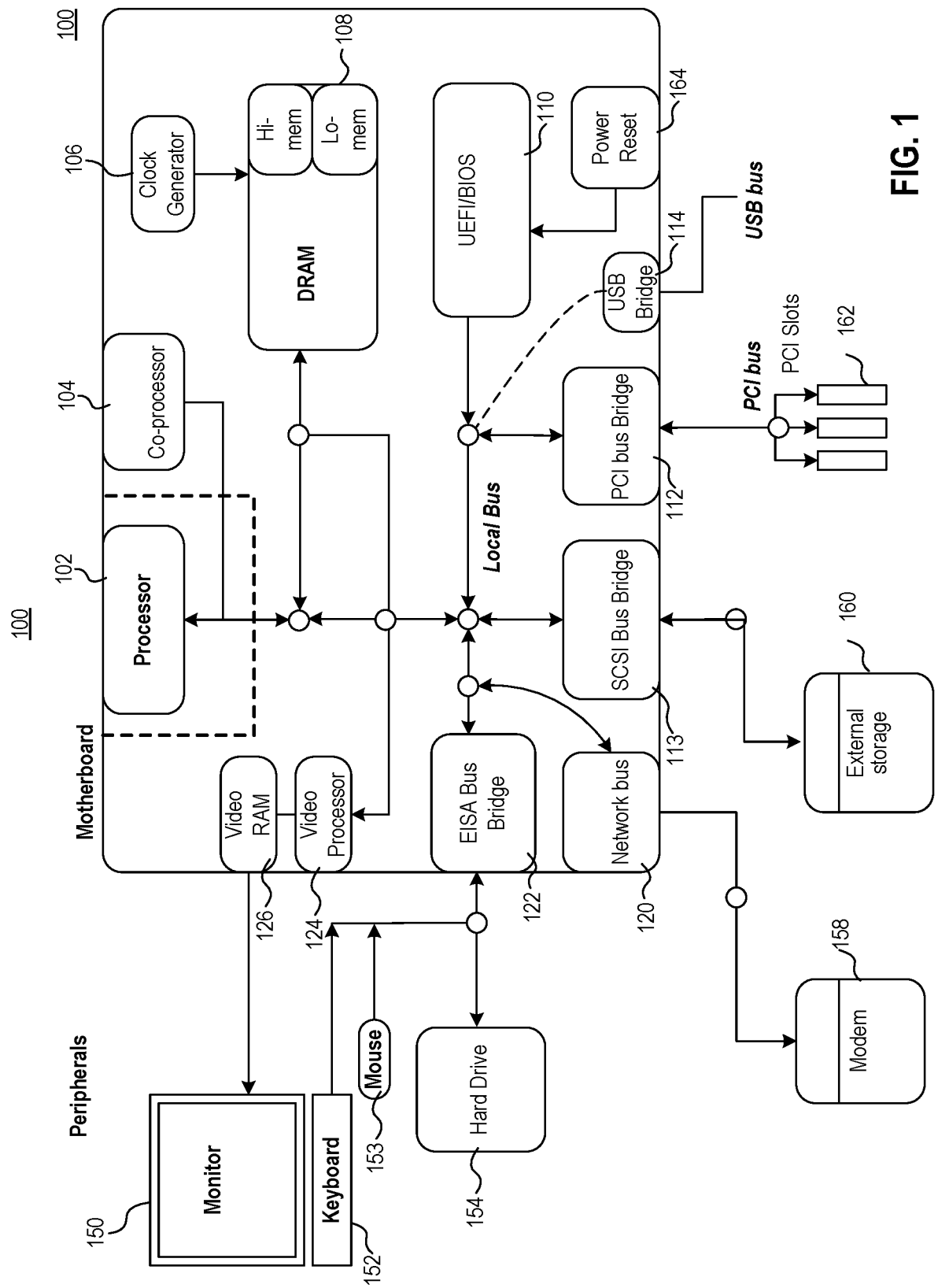
FIG. 1 is a block diagram of an exemplary platform, consistent with disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. The following detailed description is not limited to the disclosed embodiments and examples.

Some embodiments of the present disclosure may be directed to a Unified Extensible Firmware Interface (UEFI)-enforced digital right management (DRM) system in which UEFI applications may be used to control digital media installation and execution. In such embodiments, the disclosed systems and methods may employ unique cryptographic entropy of a platform for authentication (using, for example, remote attestation) and to generate platform-specific encryption keys through remote attestation processes. The disclosed system and methods may incorporate both hardware and software verification for enhanced DRM security and control. Such embodiments of the disclosed systems and methods may improve computer security by preventing unauthorized modification or execution of digital content.

Moreover, the disclosed systems and methods may improve the security of the DRM processes by enforcing security policies early, such as, for example, before any operating system initiates. To enhance the security of authentication operations, and to minimize potential attack vectors for tampering platform-specific signatures, disclosed systems and methods may perform authentication and encryption/decryption tasks in the booting firmware (e.g., within the BIOS or UEFI). For example, some embodiments of the disclosed systems and methods may employ UEFI applications to perform remote attestation, authentication, and decryption tasks without having to initiate or start a platform's operating system. In such embodiments, the disclosed systems and methods may generate and use a series of UEFI enclaves or applications to perform provisioning and/or loaders tasks. The UEFI enclaves may allow the disclosed systems and methods to incorporate on-die cryptographic unique material in authentication. The UEFI enclaves may also facilitate the disclosed systems and methods to perform remote attestation tasks using secured communications to a remote web server from within a UEFI (or BIOS) in conjunction with on die cryptographic material. In such embodiments, a platform running the UEFI applications may be provisioned and verified based on UEFI operations.

Moreover, the disclosed systems and methods describe processes to seal and store application binaries within a UEFI partition. This arrangement may facilitate the verification of payload binaries during platform boot. For example, a boot enclave may verify payload binaries with platform unique keys retrieved from within an enclave. Such processes may improve the operation of the computer security and safety by enabling verification of both the platform and the binaries transmitted to the platform. Further, the disclosed system and methods may securely run digital content on trusted platforms. For example, in some embodiments, once a payload is verified, the payload may be fully booted on the platform into a secure runtime environment (SRE). This process may improve the field of computer security and DRM by deploying a mechanism for early remote attestation that may be invulnerable to operating system-based attacks.

The disclosed systems and methods may also enforce DRM policies in a virtual machine environment by building hypervisor kernels with unique cryptographic keys that can be passed through to virtual machines (VM). For example, some embodiments of the disclosed system and methods may include operations of employing on-die cryptography and/or unique cryptographic material within UEFI enclaves to create unique keys that get stored in a virtual mode specific register (MSR). These unique keys may be used to extend the DRM policies to VMs, while at the same time creating unique keys for each VM using a virtual MSR key store.

Furthermore, the disclosed systems and method may facilitate secure deployment of hypervisors with access control based on platform signatures and remote attestation. The disclosed systems and methods may use a combination of cryptographic technologies, such as encryption, decryption, Key Derivation Functions (KDF), entropy, and Software Guard Extensions (SGX). By combining various cryptographic technologies with unique hardware cryptographic material, the disclosed systems and methods may build a software binary that is bound to specific hardware. In addition, the disclosed systems and methods may provision platforms with specific software installations.

Moreover, in some embodiments, the disclosed systems and methods may secure deployment of updates, or generally new software, by transmitting the updates (or other new software) only to verified platforms after remote attestation. For example, the disclosed systems and methods may use server and local encryption when deploying updates or new software through UEFI BIOS and on-die cryptographic material. Such embodiments may provide a secure method to provision software to certain verified platforms. The disclosed systems and methods may verify both the platform and the software being deployed to improve both cyber security and safety. The disclosed systems and methods may facilitate the deployment of verified content only to verified platforms using remote attestation and on-die cryptography. Additionally, encryption methods may secure communications between provisioning web servers and local platforms and may employ specific decryption keys to guarantee that the system is secure and that the content has not been tampered. The disclosed systems and methods may cure vulnerabilities of other provisioning methods, improve security, and provide improved control of DRM management.

Reference will now be made to the disclosed embodiments, examples of which are illustrated in the accompanying drawings.

FIG. 1 is a block diagram of an exemplary platform 100, consistent with disclosed embodiments. As shown in FIG. 1, platform 100 may include a motherboard and peripherals.

The motherboard may include a processor 102. In some embodiments, processor 102 may include any suitable processing device and/or a commercially available processor. In other embodiments, processor 102 may be a plurality of devices coupled together and configured to perform functions consistent with the present disclosure. For example, processor 102 may include a plurality of co-processors or graphical processing units, and each may be configured to run specific operations, such as floating-point arithmetic, graphics, signal processing, string processing, cryptography, and/or I/O interfacing. Processor 102 is further described in connection with FIG. 2.

The motherboard may also include a co-processor 104. Co-processor 104 may supplement the functions of processor 102. In some embodiments, co-processor 104 may perform operations of floating-point arithmetic, graphics, signal processing, string processing, cryptography, and/or I/O interfacing with peripheral devices. Co-processor 104 may offload processor-intensive tasks from processor 102, which may accelerate platform 100 performance. In some embodiments, co-processor 104 may have customized operations. For example, co-processor 104 may run customized operations to initialize the SRE and/or enforce firewalls between isolated domains.

The motherboard may also include a clock generator 106 and a DRAM (dynamic random-access memory) 108. In some embodiments, clock generator 106 may include an electronic oscillator configured to produce a timing signal. Clock generator 106 may produce a symmetrical wave and/or more complex arrangements. Clock generator 106 may also include a resonant circuit and an amplifier. In some embodiments, clock generator 106 may include one or more frequency dividers, clock multiplier sections, and programmable clocks. Clock generator 106 may be configured during a UEFI or BIOS boot to a selected value.

DRAM 108 may include a solid-state memory used for processor 102 operations. Persons of ordinary skill in the art would appreciate that DRAM 108 may include multiple types of memories and may not be limited to random-access memory. In some embodiments, for example, DRAM 108 may include read-only memory.

The motherboard may also include UEFI/BIOS 110. UEFI/BIOS 110 may include non-volatile firmware used to perform hardware initialization during the booting process (power-on startup), and to provide runtime services for operating systems and programs. In some embodiments, UEFI/BIOS 110 may include instructions to create one or more enclaves and communicate with attestation services, as further described in connection with FIGS. 7-9. UEFI/BIOS 110 may also include cryptographic keying for security handoffs when launching the protected SRE.

In some embodiments, UEFI/BIOS 110 firmware may be pre-installed on a computer by an OEM (original equipment manufacturer) and may be configured to be the first software to run when the computer is powered on. In some embodiments, UEFI/BIOS 110 may initialize and test the system hardware components. UEFI/BIOS 110 may also load a boot loader from a mass memory device, which may then initialize a hypervisor with the virtualization layer that creates the isolated domains. Further, UEFI/BIOS 110 may include cryptographical keys or instructions to connect virtual machines hosted in an SRE with isolated hardware resources in processor 102.

The motherboard may also include a power reset 164, which may be configured to re-initialize components of the motherboard and/or end current operations in platform 100. In some embodiments, power reset 164 may initialize components, and UEFI/BIOS 110 may restart platform 100 and deploy the DRM policies discussed in connection with FIG. 3.

The motherboard may also include one or more bridge components to communicate with the peripherals. In some embodiments, the motherboard may include a USB (Universal Serial Bus) bridge 114, a PCI (Peripheral Component Interconnect) bus bridge 112, a SCSI (Small Computer System Interface) bus bridge 113, and an EISA (Extended Industry Standard Architecture) bus bridge 122.

The motherboard may include video RAM 126 and video processor 124. Video RAM 126 may include a buffer between processor 102 and a display. In some embodiments, video RAM 126 may be implemented with a frame buffer so when images are to be sent to the display, they may be first read by the processor 102 as data from a form of main (non-video) RAM and then written to video RAM 126 in preparation for display. Video processor 124 may be implemented with an expansion card which may generate a feed of output images to a display device. In some embodiments, video processor 124 may include dedicated graphics cards and/or a graphics processing unit (GPU).

In addition, the motherboard may include a network bus 120. Network bus 120 may provide connectivity to any type of network configured to provide communications between the motherboard, platform 100, and other components that may communicate or be coupled with the motherboard. In some embodiments, network bus 120 may be a port for connection with any type of network that may provide communications, exchange information, and/or facilitate the exchange of information, such as the Internet, TLS communication, a Local Area Network, near field communication (NFC), optical code scanner, or other suitable connection(s) that facilitates the sending and receiving of information in platform 100.

As shown in FIG. 1, the peripherals may include a monitor 150, a keyboard 152, and a mouse 153. The peripherals may also include a hard drive 154, external storage 160, a modem 158, and PCI slots 162. Embodiments of the present disclosure also contemplate that platform 100 may include any other suitable peripheral devices.

Persons of ordinary skill in the art would appreciate that the configuration and boundaries of the functional building blocks of platform 100 have been illustrated herein for the convenience of the description. Embodiments of the present disclosure contemplate that alternative boundaries may be implemented so long as the specified functions and relationships thereof are appropriately performed. Alternatives (including equivalents, extensions, variations, deviations, etc., of those described herein) will be apparent to persons of ordinary skill in the art based on the teachings contained herein. Such alternatives fall within the scope and spirit of the disclosed embodiments.

Figure 2:
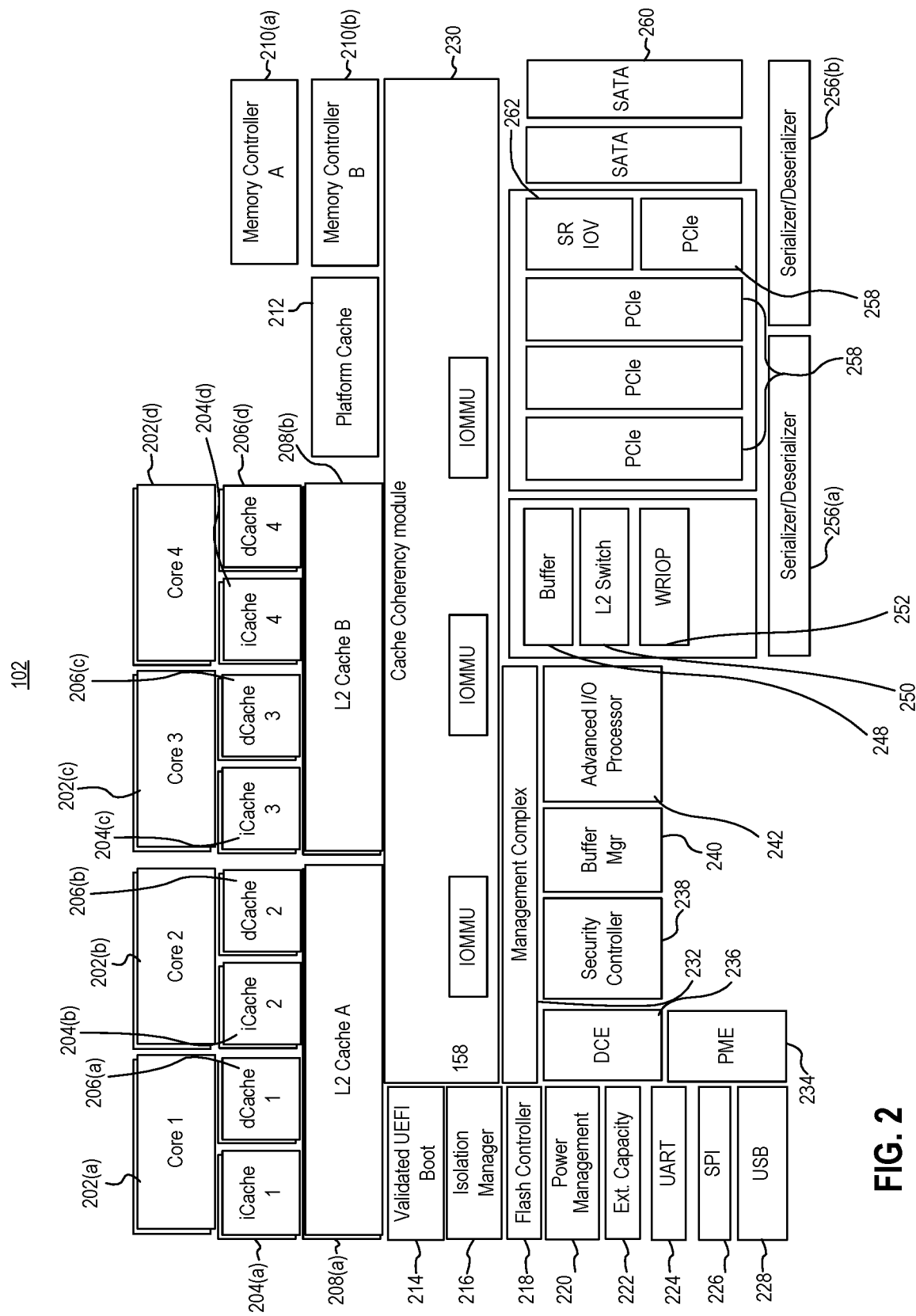
FIG. 2 is a block diagram of an exemplary processor, consistent with disclosed embodiments.

FIG. 2 shows a block diagram of an exemplary processor 102, consistent with disclosed embodiments. Processor 102 may include one or more cores 202, one or more icaches 204, one or more dcaches 206, and one or more L2 caches 208. Further, processor 102 may include one or more memory controllers 210 and a platform cache 212.

Cores 202 may be configured to perform parallel tasks to enhance efficiency of processor 102. In some embodiments, cores 202 may be physically distinct cores. In other embodiments, cores 202 may be defined virtually with multithreading or hyper-threading that may split processing units into virtual cores.

As shown in FIG. 2, a first level of cache memory may be divided in processor 102 having icache 204 and dcache 206. icache 204 may include instruction cache that may contain pre-code to demarcate individual instructions for cores 202. In some embodiments, icache 204 may include instructions to improve decode speed. dcache 206 may be a data cache. With this split between icache 204 and dcache 206, two small caches may exist, one exclusively caching instruction code and the other exclusively caching data. Software may separate code from data (global and static variables, constants, etc.). This arrangement may create a spatial separation between the actual instruction code, the hard-coded data, and dynamically allocated data, to facilitate data processing.

L2 cache 208 may include level 2 cache with an increased capacity than icache 204 or dcache 206. L2 cache 208 may serve as a bridge for the process and memory performance gap and may provide stored information to processor 102 without any interruptions or wait-states. L2 cache 208 may also be configured to reduce the access time of data. For example, L2 cache 208 may reduce the access time of data in events wherein the data may have already accessed before, so that the data may not need to be loaded again. In some embodiments, L2 cache 208 may perform buffering operations and may request data from the memory, serving as a closer waiting area compared to RAM.

Memory controllers 210 may include digital circuits that may manage the flow of data going to and from memories of processor 102 to processing units, such as cores 202. In some embodiments, processor 102 may be configured to have a unique cache, or group of caches, associated with each core 202. Additionally, and/or alternatively, hardware components may be shared between different cores. In order to prevent leakage attacks, a virtualization layer may configure memory controllers 210 to isolate and segregate memory sections for only one, or a selected group, of cores 202. Memory controllers 210 may be implemented as integrated memory controller (IMC) and/or a memory chip controller (MCC).

In some embodiments, processor 102 may include platform/L3 cache 212 to provide a higher level of cache that may facilitate distribution of information between the different cores 202. In some embodiments, platform/L3 cache 212 may provide a higher-level cache that may store descriptors, keys, contexts, and other data needed for network packet processing. By such configurations, processor 102 may keep data-plane traffic out of external memories or peripherals. The virtualization layer of the SRE implemented from UEFI/BIOS 110 may divide registers of platform/L3 cache 212 in specific isolated domains to mitigate vulnerability to certain attacks.

Processor 102 may also include one or more modules that may manage or control operations in processor 102. In some embodiments, processor 102 may include a validated UEFI boot 214, an isolation manager 216, a flash controller 218, and a power management 220.

Validated UEFI boot 214 may be a module that forces a boot using only software that is trusted by the OEM. When the PC starts, validated UEFI boot 214 firmware may check the signature of each piece of boot software, including, for example, BIOS firmware drivers (such as Option ROMs), EFI (Extensible Firmware Interface) applications, and the operating system. If the signatures are valid, processor 102 may boot, and the firmware may provide control to the operating system. If the signatures are invalid, the processor 102 may generate an alert. Isolation manager 216 may be configured to bind software application, tenants, and/or enclaves with specific hardware components isolated from each other. In some embodiments, isolation manager 216 may configure a multi-socket system creating a virtual trusted platform module (TPM) that may bind processor 102 resources to individual sockets and bridge chips. Because isolation manager 216 may pin hardware resources for specific applications or tenants, a virtualization layer configured to operate processor 102 may implement a hypervisor without a scheduler.

Flash controller 218 may be used to interface and operate a flash card. In some embodiments, flash controller 218 may operate in low duty-cycle environments, such as, for example, SD cards, CompactFlash cards, or other similar media. Power management 220 may be configured to control one or more components of processor 102 to enforce power management policies and/or disable certain elements. In some embodiments, power management 220 may perform demand-based switching (DBS) to minimize power consumption, activate turbo modes to enhance performance, and/or execute power mode managerial tasks. Moreover, and as further discussed in connection with FIG. 6, power management 220 may disable certain elements of processor 102 as provided by security levels of potential security concerns.

In some embodiments, processor 102 may include additional modules, such as external capacity module 222, UART (Universal Asynchronous Receiver Transmitter) module 224, SPI (Serial Peripheral Interface) module 226, and USB module 228.

Processor 102 may also include a cache coherency module 230 including one or more input-output memory management units (IOMMU). Cache coherency module 230 may configure cache memories in processor 102 to have shared resources. When clients in a system maintain caches of a common memory resource, problems may arise with incoherent data, particularly in a multiprocessing system. Cache coherence module 230 may manage such conflicts by maintaining a coherent view of the data values in multiple caches. The IOMMU in cache coherency module 230 may connect a direct-memory-access I/O bus to the main memory. IOMMU may translate CPU-visible virtual addresses to physical addresses and may map device-visible virtual addresses (also called device addresses or I/O addresses in this context) to physical addresses. Further, IOMMU may protect cache memories in processor 102 from faulty or malicious devices. In some embodiments, firmware stored in UEFI/BIOS 110 (FIG. 1) may manipulate IOMMU to segregate resources and create isolated domains with dedicated hardware components from processor 102.

As shown in FIG. 2, processor 102 may also include a management complex including a module PME (Power Management Event) 234. In some embodiments, PME 234 may be configured to facilitate a UEFI/BIOS setup utility and/or facilitate power for the network card when the system is shut down. UEFI/BIOS 110 may be configured to run configure and execute applications for DRM processes as further discussed in connection with FIGS. 7-9. Further UEFI/BIOS 110 may perform SRE processes to pin resources from the isolated domains. Moreover, the management complex may include a DCE (Distributed Codec Engine) 232, a security controller 238, a buffer management 240, and an I/O processor 242.

Processor 102 may also include a buffer 248 configured to control data in cache coherency module 230, a L2 switch 250 configured to control exchanges between, for example, L2 Cache 208 and dcache 206, and an acceleration module 252. Processor 102 may include a serializer/de-serializer 256, one or more PCI cards 258, and one or more SATA (Serial Advanced Technology Attachment) modules 260. Further, processor 102 may include a module for SR-IOV (Single Root I/O Virtualization) 262.

Figure 3:
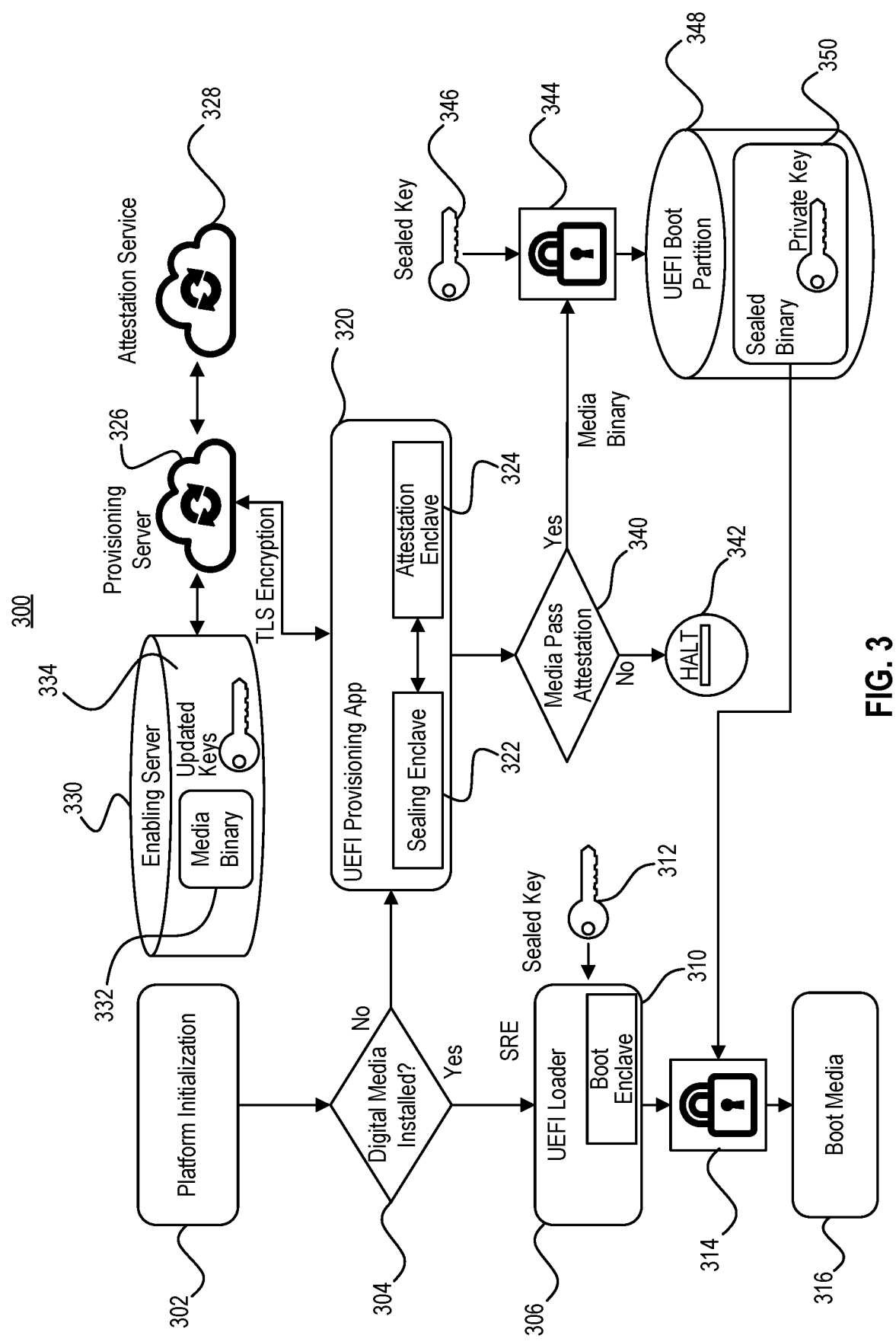
FIG. 3 is a block diagram illustrating an exemplary UEFI-based launch of secured digital media, consistent with disclosed embodiments.

FIG. 3 illustrates a block diagram 300 describing an exemplary UEFI-based launch of secured digital media, consistent with disclosed embodiments. The process described by block diagram 300 provides DRM through UEFI applications and remote attestation. In such a configuration, digital media may be secured and enforced by combining remote attestation and on-die cryptography at the booting stage, without starting an operating system. The process described in block diagram 300 improves security of the computer operation as the process ties digital rights to specific machines and minimizes opportunities for tampering.

Block diagram 300 shows an initial stage of platform initialization 302. For example, in some embodiments, a platform, such as a computer, server, or platform 100 (FIG. 1) is powered up or otherwise initialized. The platform's processor (e.g., processor 102) may perform a discovery operation 304 in which the processor determines whether a target digital media is installed. For example, the digital media that is enforced through UEFI-based DRM may include a secure runtime environment (SRE). In such embodiments, discovery operation 304 may include the determination of whether the SRE has been installed. Discovery operation 304 may be performed by a UEFI application configured to analyze memory positions in the platform and/or parse registers. Alternatively, and/or additionally, discovery operation 304 may include BIOS-based programs that analyze digital media already installed in the platform.

If discovery operation 304 determines that the digital media has been installed, processor may execute, initialize, or stand up a UEFI loader 306. As shown in FIG. 3, UEFI loader 306 may include a boot enclave 310. The UEFI loader 306 may be configured to load installed media via boot enclave 310. In some embodiments, UEFI loader 306 may include extensible firmware with the ability to read from entries from disk partitions by not just booting from a disk but booting from a specific boot loader in a specific location on a specific disk. In such embodiments, UEFI loader 306 may define executable formats to be initialized at initialization and run the executable formats. Moreover, UEFI loader 306 may have backward compatibility, to be able to boot a system, like, for example, BIOS firmware, and search for a master boot record (MBR) and run the boot loader from there.

As shown in FIG. 3, in some embodiments, UEFI loader 306 may perform encryption or decryption operations. For example, UEFI loader 306 may decrypt digital media using a sealed key 312. In some embodiments, sealed key 312 may include an AES key. The AES key may get stored locally in the platform. In some embodiments, however, the AES key may be retrieved from a different location. Using sealed key 312 and boot enclave 310, UEFI loader 306 may perform a decryption operation 314 to decrypt files (such as binary files). When decryption operation 314 is successful, the processor may perform a boot media operation 316, in which the target media (which was discovered at discovery operation 304) is opened, executed, and/or loaded.

When discovery operation 304 returns a negative result (e.g., that a target digital media has not been installed in the platform), the processor may initialize or start a UEFI provisioning application 320. As shown in FIG. 3, UEFI provisioning application 320 may include a sealing enclave 322 and an attestation enclave 324. Sealing enclave 322 may be configured to perform operations for secure data saving. For example, sealing enclave 322 may provide protections data only if it is in the enclave that is part of the main memory. Therefore, sealing enclave 322 may be transitory and get destroyed, and any data that is secured within the enclave will be lost after a sealing operation. In some embodiments, however, sealing enclave 322 may be configured to reuse data through special arrangements to store the data outside the enclave.

Attestation enclave 324 may be configured to perform remote attestation services. For example, as further described in connection with FIG. 8, attestation enclave 324 may perform remote attestation tasks to facilitate a remote provider (also known as a relying or challenger party) to verify the identity of a platform. Attestation enclave 324 may perform operations to identify software being attested, determine details of an unmeasured state (such as the execution mode), and provide assessment of possible software tampering. In some embodiments, attestation enclave 324 may create and use encrypted communication channels to an attestation server. Secrets, such as credentials or other sensitive data, can be provisioned directly to attestation enclave 324. Moreover, attestation enclave 324 may support Enhanced Privacy ID for remote attestation or Elliptic Curve Digital Signature Algorithm (ECDSA)-based remote attestation.

As shown in FIG. 3, UEFI provisioning application 320 may communicate with a provisioning server 326. In some embodiments, the communication between UEFI provisioning application 320 and provisioning server 326 may be encrypted. For example, and as further discussed in connection with FIG. 9, UEFI provisioning application may be configured to establish SSL/TLS encryption communication with provisioning server 326. Other types of communication are also contemplated. For example, UEFI provisioning application 320 may connect to servers via Lightweight Cryptography, NSS, GnuTLS, Polar SSL, MatrixSSL. Furthermore, UEFI provisioning application 320 may couple to servers through blockchain operations. Alternatively, UEFI provisioning application 320 may couple to servers without encryption. For example, in some embodiments, the communication from UEFI provisioning application 320 and servers may be performed with physical devices (e.g., USB drives or hard drives) that are transported with attestation-based data to verify platforms.

Provisioning server 326 may perform operations for validating the identity of a platform. For example, provisioning server 326 may communicate with an enabling server 330 to verify whitelists, or blacklists, of platforms. Enabling server 330 may include the media binary 332 and updated keys 334. Media binary 332 may be digital media that can be installed or operated by the platform, initialized during platform initialization 302. Updated keys 334 may include RSA keys configured to encrypt and/or decrypt media binary 332.

Provisioning server 326 may also communicate with an attestation service 328. Attestation service 328 may perform operations for verifying a remote party. Attestation service 328 may provide verification for the application's identity, the application intactness (e.g., that it has not been tampered with), and that the application is running securely within an enclave. In certain instances, the enclave's contents may be accessed remotely, not from the same platform. Attestation service 328 may facilitate attestation enclave 324 to make remote access secure. This provides remote deployment of sensitive media. Moreover, attestation service 328 may employ both symmetric and asymmetric key systems. Provisioning server 326 may provide keys and attestation data via the encryption communication to the UEFI provisioning application 320.

The processor may perform a verification operation 340 in which the processor determines whether the media passes the attestation. Based on the keys and attestation data received from servers, the processor may determine whether the media has passed attestation and it may be unlocked. If the verification operation 340 is unsuccessful the processor may halt the operation and generate a halt message 342 and/or record the unsuccessful verification. If the verification operation 340 is successful, processor may perform a decryption operation 344 using a sealed key 346. Sealed key 346 may include an AES key received from provisioning server 326 and/or attestation service 328.

In some embodiments, the encrypted medium may be a Transport Layer Security (TLS) encrypted channel, the initial key (e.g., updated keys 334) may include a Rivest-Shamir-Adleman (RSA) public key, sealed key 346 may include a symmetric private key, and receiving the binary file may include verifying attestation of the binary file within the attestation enclave.

When media binary 332 is decrypted, a UEFI boot partition 348 may perform decryption operation 314 to unseal the sealed binary using a private key 350. Private key 350 may include an RSA private key configured to decrypt binary files. A successful decryption would then result in boot media operation 316.

Figure 4:
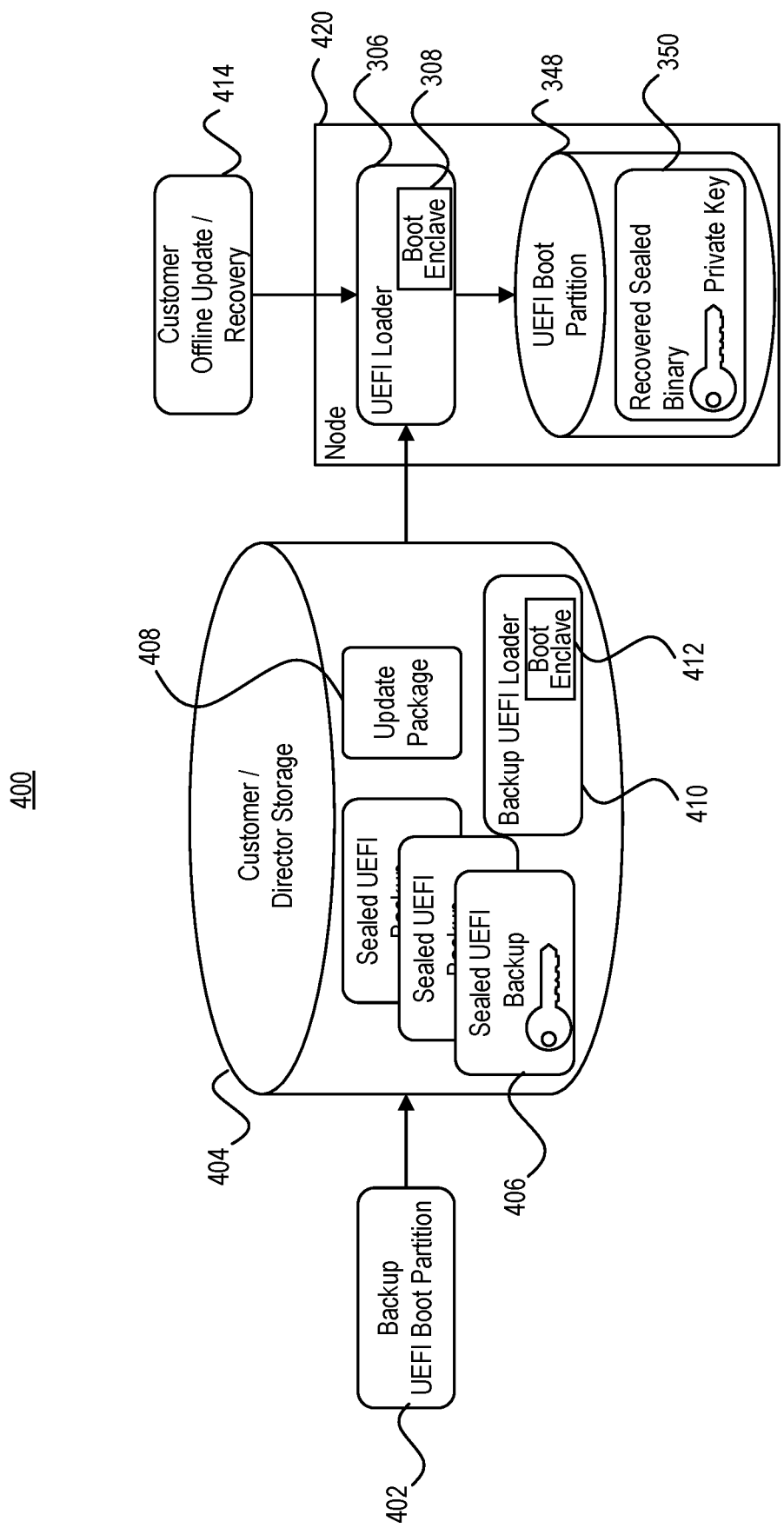
FIG. 4 is a block diagram illustrating a customer offline recovery and update installation process, consistent with disclosed embodiments.

FIG. 4 illustrates a block diagram 400 describing a customer offline recovery and update installation process, consistent with disclosed embodiments. In some embodiments, backup and/or recovery files may be delivered and secured through the UEFI-based DRM process described in FIG. 3. Block diagram 400 describes a process for completing system integration and validation on platforms. Block diagram 400 describes a use case for customer offline recovery and update installation on target platforms.

A backup UEFI boot partition 402 may be initialized (or stood up) during a platform initialization. The boot partition 402 may communicate with a customer/director storage which may store a plurality of sealed UEFI backups 406 and an update package 408. During platform initialization, backup UEFI boot partition 402 may identify one or more of the sealed UEFI backups 406 based on attestation data of the platform. Identified UEFI backups 406 may then get loaded in the backup UEFI loader 410, which may be similarly configured to UEFI loader 306 (FIG. 3), and a boot enclave 412 may perform the booting operations to initialize the media backup.

The booting operation may run in a platform node 420. Once the backup or update operation identifies update or backup packages to be installed, the packages may be transmitted to a platform node for installation. The platform node, may also receive customer offline update/recovery data 414, giving users the option to independently install updates or recovery that may not be in customer/director storage 404. The platform node may include components previously described in connection with FIG. 3. Platform node 420 may include UEFI loader 306, with boot enclave 308, and UEFI boot partition 348, with a private key 350 that is configured to decrypt the recovery sealed binary.

Block diagram 400 depicts that, in some embodiments, the processor may use the UEFI-enforced DRM policies for recovery or updates in a client platform. As shown in FIG. 4, the recovery/update may be performed online or offline. For example, in some embodiments, the UEFI-DRM secured content may be an update recovery script and UEFI loader 306 may be configured to retrieve recovery instructions after decrypting the sealed binary file using the second UEFI application.

Figure 5:
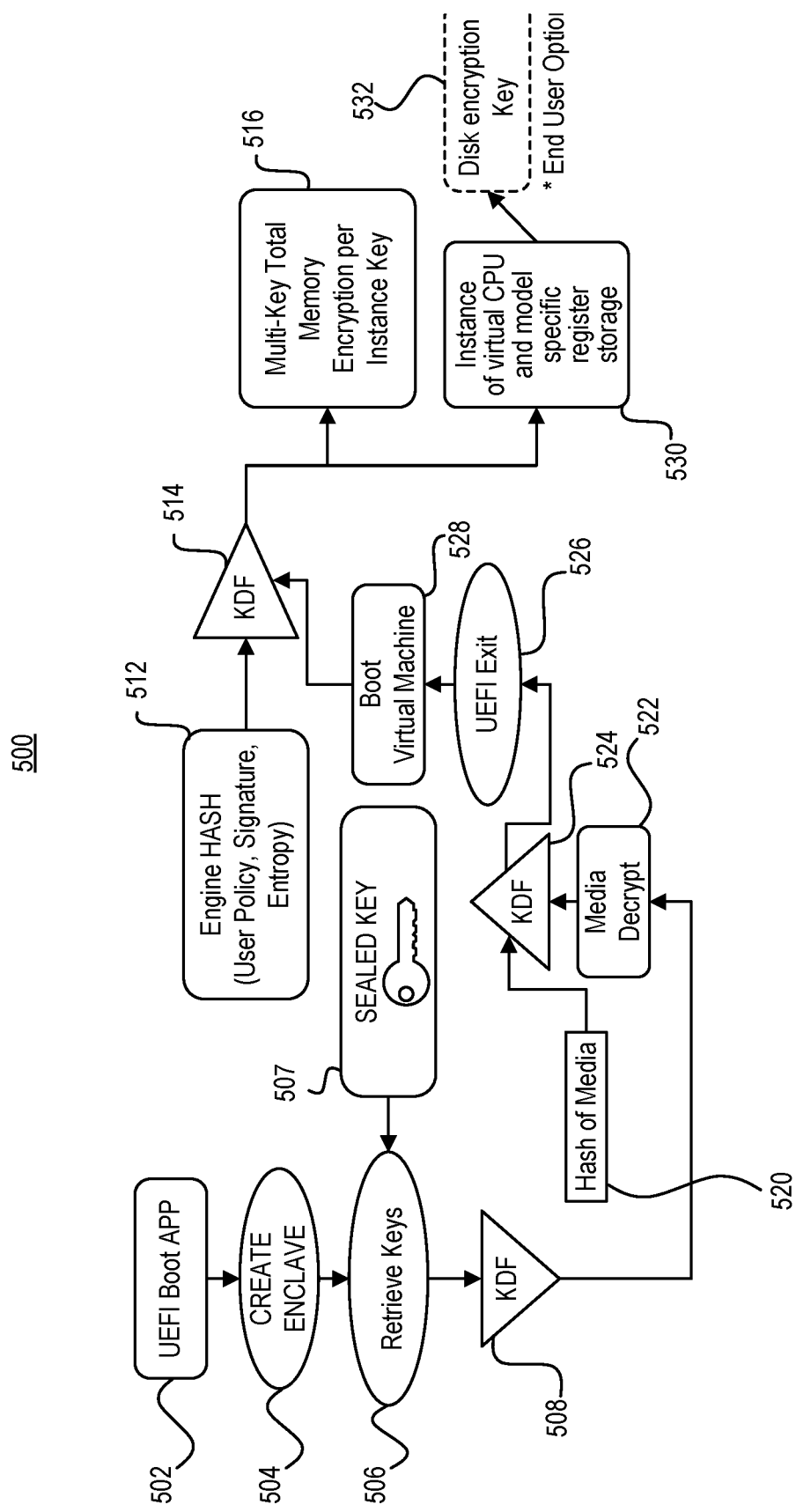
FIG. 5 is a flowchart of an exemplary process for digital rights management in virtual machines through a secured hypervisor, consistent with disclosed embodiments.

FIG. 5 is a flowchart of an exemplary process 500 for digital rights management in virtual machines through a secure hypervisor, consistent with disclosed embodiments. Process 500 may be performed by platform 100 (FIG. 1) or processor 102 (FIG. 2). Additionally, and/or alternatively, different layers of applications within a processor may perform specific steps of process 500. For example, a UEFI application may perform some steps of process 500 while a virtual machine root may perform other steps of process 500. Additionally, an SRE tenant may perform certain operations of process 500 and a virtual machine OS may perform certain steps of process 500.

In step 502, an UEFI boot application may initialize as part of a platform boot up or initialization. For instance, as further described in connection with FIG. 3, a processor may initialize UEFI applications for discovery, such as discovery operation 304 (FIG. 3). In step 504, platform 100 (or processor 102) may create an enclave. For example, through the UEFI boot application, processor may generate a boot enclave or attestation enclave, such as attestation enclave 324. In some embodiments, the enclave of step 504 may include a Software Guard Extensions (SGX) enclave and may be configured to define private regions of memory with contents that are protected and unable to be either read or saved by any process outside the enclave itself. Moreover, the enclave of step 504 may be decrypted on the fly only within the platform itself. Further, in some embodiments, enclaves may be restricted to only operate code and data running from within the enclave itself. Such a configuration may protect the code within the enclave from being "spied on" or examined by other code.

Moreover, in some embodiments, the code and data in enclaves created in step 504 may utilize a threat model in which the enclave is trusted but no process outside it can be trusted (including the operating system itself and any hypervisor), and therefore these are treated as potentially hostile. In such embodiments, the enclave contents may be unable to be read by any code outside the enclave, other than in its encrypted form.

In step 506, platform 100 may retrieve keys. For example, processor 102 (FIG. 2) may communicate with servers to retrieve AES and/or RSA keys. In step 507 the platform may receive and/or seal the key to generate a sealed key.

In step 508, platform 100 may perform a key derivation function (KDF) using keys retrieved in step 506. For example, the platform may perform operations to specify a key derivation policy though one of the UEFI enclaves. In some embodiments, the platform enclaves may enforce policies that allow the use of trusted values and/or the attributes of the enclave. Furthermore, the KDF may use platform-specific policies, such as automatically setting to zeros in unassigned fields. Step 508 may also include platform specific values or variables. For example, in step 508, platform 100 may add entropy coming from the user (e.g., an owner epoch may be used as a parameter during the derivation). This value may be configured at boot-time by the derivation of a password, and saved during each power cycle in a non-volatile memory.

Derived keys from step 508 may then be used to decrypt media in step 522 in which the platform may unseal or decrypt media. For example, as discussed in connection with FIG. 3, platform 100 may be configured to decrypt digital media that is received from provisioning server 326. The media may then be secured again through a second KDF in step 524 and/or employing a hash function in step 520. Once the data is decrypted with retrieved keys, and secured again using on-die entropy for new functions, the platform may exit the UEFI application in step 526.

In some embodiments, steps 502-526 may be performed by an UEFI application running in the processor. For example, a UEFI application in processor 102 (FIG. 2) may preform operations of steps 502-526. Additionally, and/or alternatively, steps 502-526 may be executed by an SRE UEFI application that creates secure enclaves for launching virtual machines.

In step 528, platform 100 may boot a virtual machine from the UEFI application. For example, platform 100 may perform a validated enforced boot from a UEFI to launch a protected environment, which may allow users to isolate processor 102 resources for enclaves. In some embodiments, the protected environment launched in step 528 may create isolated domains that may protect processor 102 from cross-domain attacks. Thus, in step 528 platform 100 may create a protected environment that avoids leakage, modification, and privilege escalation attacks. The protected environments may create the isolated domains with specific processor 102 resources by binding user applications to virtualized guests using the PCH (Platform Controller Hub) and each processor's unique identification. For example, a protected environment may establish a multi-socket system that allocates resources from processor 102 to corresponding enclaves, virtual machines, kernels, and/or user applications. In some embodiments, the boot of the virtual machine may manipulate addresses and/or registers of bridging chips or PCIe cards to isolate processor resources.

Moreover, to protect and create isolated domains, boot of virtual machine in step 528 may create on-chip firewall policies. In some embodiments, protected environment may directly map a PCIe device cryptographically to a specific virtual machine guest or an application tenant. Protected environment may implement rules or policies that may restrict access to certain resources based on the rules setup by the firewall. Further, protected environment may implement a type 0 or type 1 hypervisor that has a built-in security policy to restrict access to processor resources, protecting the individual, core, and memory resources of processor 102. Protected environments may involve layered protocols, wrappers, or content addressable memory filters to associate processing requests from specific enclaves and determine whether they have access to specific resources or route them to a specific domain. Further, protected environments deployed in step 528 may perform regular expression matching or implement a payload scanner to determine the access or route of the processing requests.

The protected environments and any virtual machines launched in step 528 may be secured. For example, in step 512, an engine hash may generate a hashing function that is based on a user policy, a signature, and/or on-die entropy. The engine hash may be used for a third KDF 514. In this way, the unique cryptographic material within UEFI enclaves may be used as a source of entropy to create additional unique keys that may be stored in a virtual Mode Specific Register (MSR) so a hypervisor may make these keys available during step 528 to launched VMs. The configuration shown in FIG. 5 may extend the on-die DRM to VMs at the same time creating unique keys for each VM using a virtual MSR key store. In some embodiments, steps 514 and 528 may be performed by a virtual machine root while step 512 may be performed or stored in a tenant policy.

In step 516, platform 100 may perform a multi-key total memory encryption per instance key. For example, platform 100 may perform operations to build and support multiple encryption keys. In such embodiments, and SRE tenant may perform a security operation to support encryption keys. Platform 100 may also run software that can configure a subset of available keys. Step 516 may also include providing for nonvolatile memory or when combined with attestation mechanisms and/or used with key provisioning services.

In step 530, platform 100 may generate an instance of virtual CPU and use the model specific register key storage to assign validation keys. For example, in step 530, platform 100 may execute a bootloader that loads the hypervisor according to the addresses specified in step 516. In such embodiments, platform 100 may operate a hypervisor that is built with a multiboot header, which presents sets flags for passing memory information through a Multiboot Information (MBI) structure. Moreover, platform 100 may verify the VCPU using keys in the virtual MSR.

Accordingly, in some embodiments, the UEFI-enforced DRM processes may secure a hypervisor configured to launch virtual machines with segregated resources of the at least one processor. In such embodiments, UEFI applications may be configured to generate a plurality of third keys using unique on-die cryptographic unique material and store the plurality of third keys in a mode specific register of the platform. Process 500 may facilitate validating virtual machines on the hypervisor using at least one of the plurality of third keys.

In step 532, an encrypted disk and/or enclave may be given to a user for a specific operating system or a user application. For example, in step 532, a Linux Unified Key Setup (LUKS) may be used as a disk encryption specification. Other disk encryption or target applications from the verified VCPUs are also contemplated. For example, in step 532, platform 100 may execute other types of virtual machines or run different operating systems.

Figure 6:
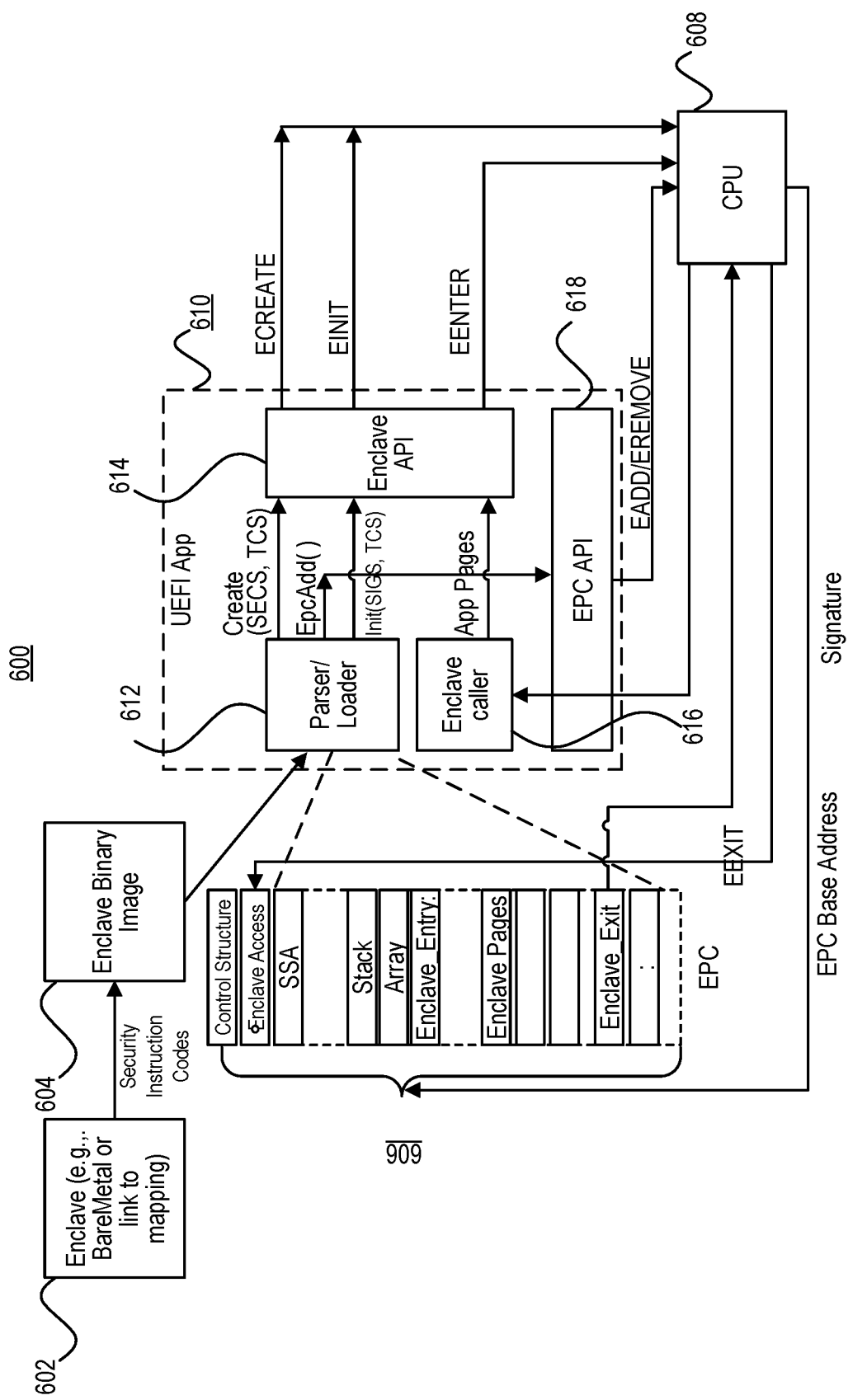
FIG. 6 is a block diagram of UEFI application generating enclaves, consistent with disclosed embodiments.

FIG. 6 is a block diagram 600 of UEFI application generating enclaves, consistent with disclosed embodiments. Elements in block diagram 600 may be part of platform 100. For example, elements of block diagram 600 may be implemented by processor 102.

As shown in FIG. 6, an enclave 602 may communicate security instruction codes to an enclave binary image 604. Enclave 602 may be supported by a BareMetal operating system and/or include links to certain mappings or events. Further, enclave 602 may be created at step 504 (FIG. 5). Enclave binary image 604 may also communicate with a UEFI application 610, which may include UEFI provisioning application 320 or UEFI loader 306 (FIG. 3). UEFI application 610 may be any of the UEFI applications described in connection with FIGS. 3 and 5. Alternatively, and/or additionally, UEFI application 610 may be implemented as UEFI loader 306 or UEFI boot partition 348 (FIG. 4).

UEFI application 610 may include a parser/loader 612, an enclave caller 616, an enclave application programing interface (API) 614, and an enclave page cache (EPC) API 618.

Parser/loader 612 may be configured to communicate with both enclave API 614 and EPC API 618. For example, parser/loader 612 may send create requests to enclave API 614. In some embodiments, the create requests may specify an enclave control structure and a thread control structure. Further, parser/loader 612 may also send initialization instructions to the enclave API to, for example, initialize enclaves using security keys as described in connection with FIG. 3. Parser/loader 612 may also send requests to add memory spaces or enclave addressing to EPC API 618. Enclave caller 616 may be configurable to transmit pages request to the enclave API 614.

Both enclave API 614 and EPC API 618 may communicate with a CPU 608. For example, as shown in FIG. 6, enclave API 614 may transmit instructions for creating an enclave, initializing an enclave, or transferring control. For example, enclave API 614 may transmit an ECREATE instruction to instantiate a new enclave, defining the enclave's address space, and root of trust. Enclave API 614 may also transmit instructions such as EENTER to transfer the control from the application to a pre-determined location within the enclave. Additionally, enclave API 614 may be configured to transmit instructions to verify enclave structures. For example, enclave API 614 may submit an EINIT instruction to verify Token Structures and determine whether an enclave is allowed to execute.

Similarly, EPC API 618 may also be configured to communicate with CPU 608 and transmit operations. For example, as shown in FIG. 6, EPC API 618 may transmit operations to remove or add pages. EPC API 618 may transmit EADD instructions to add a new page to an enclave. In such embodiments, the operating system of CPU 608 may be solely responsible for choosing the page and its content. Alternatively, and/or additionally, EPC API 618 may transmit operations of EREMOVE to permanently remove a page from the enclave.

In addition to communicating with APIs in UEFI application 610, CPU 608 may also communicate with Enclave Page Cache (EPC) 606, which may be a memory structure including content blocks as described in FIG. 6. For example, enclave page cache 606 may include a control structure, such as SGX Enclave Control Structure (SECS). Each enclave may be associated with a control structure containing its metadata (e.g. its hash and size). The control structure may be only accessible through secure code and only by the processor itself. Enclave page cache 606 may also be associated with at least a thread control structure that may provide enclave control access. Further, the thread control structure may indicate an execution point into the enclave. Enclave page cache 606 may also include one or more save state areas (SSAs) used to save the processor's state during the exceptions and interruptions handling. Moreover, enclave page cache 606 may include one or more stack and array sections and specify enclave entry, pages, and exit.

As shown in FIG. 6, CPU 608 may send and receive instructions from enclave page cache 606. For example, CPU 608 may transmit instructions to initiate pages and receive instructions to terminate an enclave (such as EEXIT instructions). Further, CPU 608 may perform verification operations based on signatures and base addresses.

Block diagram 600 shows an exemplary implementation of a UEFI application to generate the enclaves discussed in connection with FIG. 3 (e.g., enclaves for provisioning a processor and/or determining installed applications). However, other implementations may be possible with different sequences, connections, and/or instructions.

Figure 7:
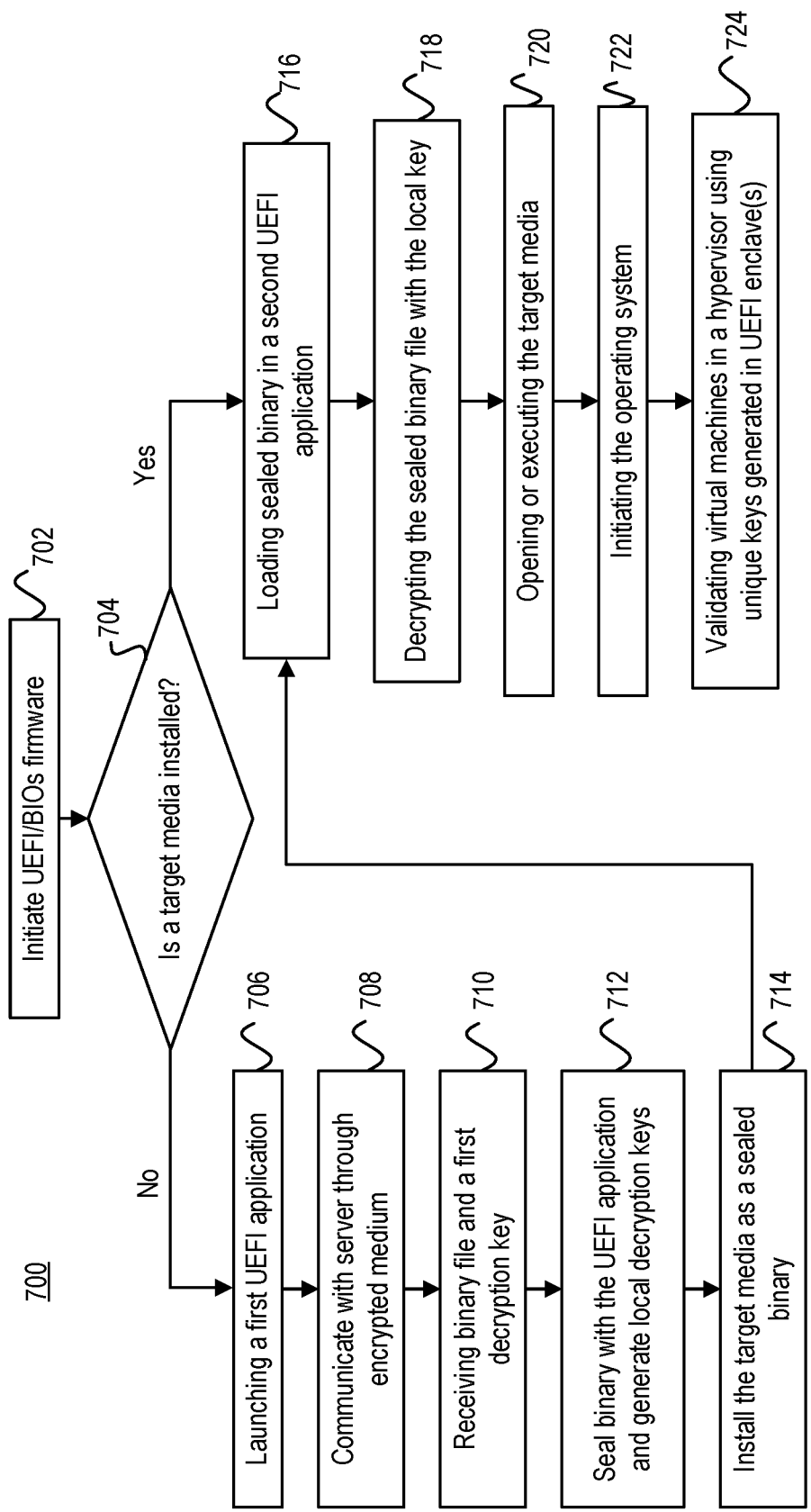
FIG. 7 is a flowchart of a process for launching UEFI-secured digital content, consistent with disclosed embodiments.

FIG. 7 is a flowchart of a process 700 for launching UEFI-secured digital content, consistent with disclosed embodiments. In some embodiments, as described below, platform 100 (FIG. 1) may perform the operations in process 700. For example, processor 102 and/or UEFI/Bios 110 may perform operations in process 700. Additionally, and/or alternatively, multiple elements of platform 100 may perform operations of process 700. For instance, while processor 102 may perform certain operations of process 700, co-processor 104 or UEFI/BIOS 110 may perform other operations. In other embodiments, however, standalone processors or components of processors may perform steps in process 700. In such embodiments, specific elements of processor 102 (FIG. 2) may perform steps of process 700 or any of cores 202 may perform one or more of the operations of process 700.

In step 702, platform 100 may initiate UEFI/BIOS firmware. For example, in response to power up of platform 100, platform 100 may execute initiation routines in UEFI/BIOS 110 (FIG. 1). As part of the initiation routines, and before initiating any operating system, platform 100 may determine if a target media has been installed in step 704. For example, platform 100 may parse memory blocks to determine whether a target application has been installed in the platform 100. Alternatively, and/or additionally, in step 704, platform 100 may initiate a UEFI application that reviews data logs or manifests to determine whether certain digital media is available. In some embodiments, the target digital media may be a secure runtime environment (SRE) or a hypervisor.

If platform 100 determines that the target media has not been installed (step 704: No), platform 100 may continue to step 706. In step 706, platform 100 may launch a first UEFI application. For example, platform 100 may launch UEFI provisioning application 320. In step 708, platform 100 may communicate with a server through an encrypted medium. For example, using the first UEFI application of step 706, platform 100 may communicate via TLS with a server that provides digital media and/or binary files. In some embodiments, as discussed in connection with FIG. 3, UEFI provisioning application 320 may communicate with provisioning server 326. In such embodiments, as further discussed in connection with FIG. 9, the first UEFI application may handle encryption setups and communication procedures.

In step 710, platform 100 may receive binary files and a first decryption key. For example, platform 100 may receive a binary file of the target media (discovered in step 704) and an AES or RSA key for sealing and/or decryption processes. In some embodiments, step 710 may also include verifying attestation data. For example, as discussed in connection with FIG. 3, an attestation enclave in the first UEFI application may verify attestation of the binary files within secure attestation enclave. In step 712, platform 100 may seal the received binary with the UEFI application (from step 706) and generate a local decryption keys. For example, a sealing enclave in the first UEFI application may seal the binary files. In such embodiments, the sealing enclave may perform sealing of binaries with the receive key within sealing the secure sealing enclave.

In step 714, platform 100 may install the target media as a sealed binary. For example, platform 100 may install the binary file sealed in step 712 on a storage device of platform 100. Step 714 may result in platform provisioning of the target media.

If in step 704 platform 100 determines that the target media is installed (step 704: Yes), platform 100 may skip steps 706-714 and move to step 716. That is, while in some scenarios, platform 100 may continue to step 716 after step 714, in other scenarios platform 100 may continue to step 716 after step 704.

In step 716, platform 100 may load a sealed binary in a second UEFI application. For example, platform 100 may load the binary sealed in step 712 in step 716 in UEFI loader 306. Alternatively, and/or additionally, platform 100 may retrieve a previously sealed binary file from a storage device and load it into a UEFI loader with a booting enclave. In some embodiments, the sealed binary is loaded into a secure boot enclave with sealed AES key, and cryptographic entropy within the enclave is used with the sealed key to verify each boot module binary. Through the second UEFI loader or the second UEFI application, platform 100 may decrypt the sealed binary file with the local decryption keys in step 718. For instance, platform 100 may use a locally generated key to decrypt sealed binaries.

Upon successful decryption, in step 720, platform 100 may open or execute the target media. For example, if decryption in step 718 is successful, the sealed software or target media may be executed. At this point, platform 100 would have been provisioned and verified using on-die cryptography to guarantee both security and safety of the media to be executed. Using CPU on die cryptographic unique material within an enclave prevent execution of digital media on unauthorized platforms. Thus, process 700 forces cryptographic verification of the platform both during media provisioning and during execution. Further, steps 702-718 may be configured to be performed before the operating systems is even initialized using UEFI applications for communication with provisioning servers, encryption, sealing, and also decryption tasks. Such features may improve the functioning of the computer as they may minimize attack vectors while facilitating the provisioning of platforms with automated processes that require no intervention from the final user.

Up until step 720, platform 100 may have performed steps 702-718 without initializing an operating system but, instead, using UEFI applications. At step 720, platform 100 may initiate the operating system. In some embodiments, the initiation of the operating system in step 720 may be conditioned on the successful decryption in step 718. In step 724, platform 100 may validate virtual machines in a hypervisor using unique keys generated in one of the UEFI enclaves. For example, as discussed in connection with FIG. 3, platform 100 may generate keys using on-die entropy to generate the cryptographic material and store the keys in a virtual MSR key. Such operations extend DRM to virtual machines. For instance, platform 100 may use unique cryptographic material within UEFI enclaves as a source of entropy to create unique keys that a hypervisor (which may start with the operating system in step 722) can make available for VMs. In step 724, platform 100 may extend UEFI-enforced DRM services to VMs. Such implementation may improve the technical field of DRM as the DRM enforcement does not require the use of separate physical provisioning servers for each OEM or an external trusted platform.

Figure 8:
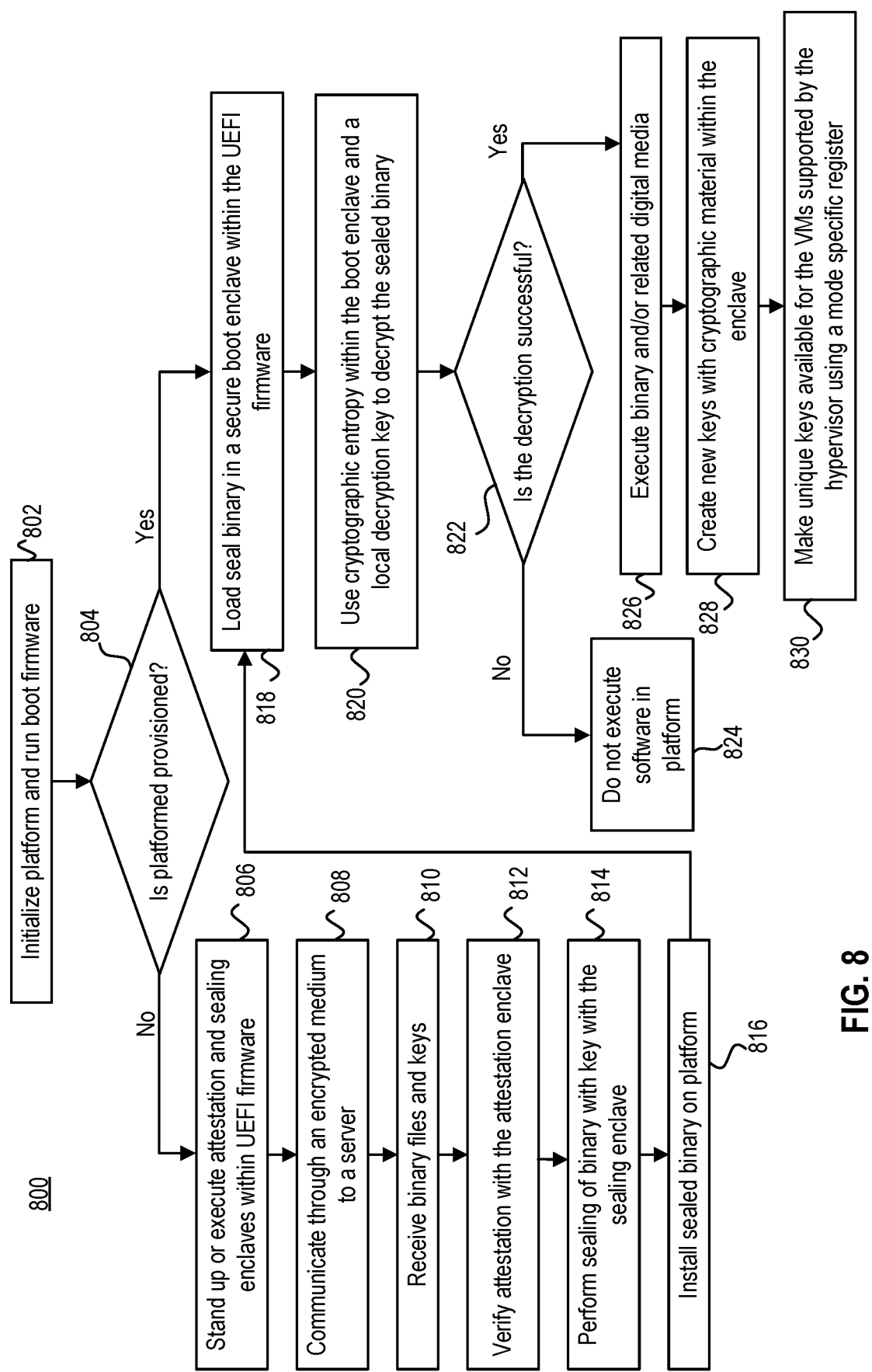
FIG. 8 is a flowchart of a process for UEFI-based provisioning of digital content through remote attestation, consistent with disclosed embodiments.

FIG. 8 is a flowchart of a process 800 for UEFI-based provisioning of digital content through remote attestation, consistent with disclosed embodiments. In some embodiments, platform 100 (FIG. 1) may perform the operations in process 800. For example, processor 102 or UEFI/Bios 110 may perform operations in process 800. Additionally, and/or alternatively, multiple elements of platform 100 may perform operations of process 800. For instance, while processor 102 may perform certain operations of process 800, co-processor 104 or UEFI/BIOS 110 may perform other operations. In other embodiments, however, standalone processors or components of processors my perform steps in process 800. In such embodiments, specific elements of processor 102 (FIG. 2) may perform steps of process 800. For instance, any of cores 202 may perform one or more of the operations of process 800.

In step 802, platform 100 may initialize a platform and run boot firmware. For example, platform 100 may initialize the platform during boot up and execute basic input/output system to initialize the platform. In step 804, platform 100 may determine whether it has been provisioned. For example, platform 100 may determine whether certain digital media has been installed in storage devices of platform 100 or whether there is digital content already present in the platform.

If platform 100 determines that the platform has not been provisioned (step 804: No), platform 100 may continue to step 806. In step 806, platform 100 may stand up or execute attestation and sealing enclaves within UEFI firmware. For example, as discussed in connection with FIG. 3, platform 100 may stand up a UEFI application with an attestation enclave and a sealing enclave, like UEFI provisioning application 320 (FIG. 3). In step 808, platform 100 may communicate through an encrypted medium to a server to provide attestation data and request provisioning files. Platform 100 may communicate attestation data to a provisioning server. The provisioning server may verify platform 100 based on attestation data and communicate, through encrypted mediums, binary files and verification devices. For example, as discussed in connection with FIGS. 3 and 5, platform 100 may communicate with a provisioning server 326 through UEFI provisioning application 320, which in turn may interface attestation service 328 and enabling server 330.

In step 810, platform 100 may receive binary files and keys. For example, platform 100 may receive binary media files from a provisioning server and/or AES or RSA keys. In step 812, platform 100 may verify attestation with the attestation enclave in the UEFI application. For example, in some embodiments, platform 100 may perform an SGX remote attestation in step 812. In such embodiments, the attestation enclave in the UEFI application may perform stages of remote attestation. Further, platform 100 may make a remote attestation request, perform a local attestation, convert the local attestation to a remote attestation, return the remote attestation to a challenger, and verifying the remote attestation. Platform 100 may perform the following stages for SGX remote attestation:

Stage 1: Establishing a communication with the challenger—an entity that wishes to validate whether the application is running securely within UEFI enclaves.

Stage 2: Linking applications to its quoting enclave by storing its enclave identity (a cryptographic hash of the enclave's log that restricts access to the enclave's contents for unauthorized parties).

Stage 3: Generating an ephemeral public key—one that only lasts for a short period of time—and responses to the challenge. This key may be used by the challenger for provisioning secrets to the enclave.

Stage 4: Receiving a report including information about the key and its originating enclave, and forwarding the report to the quoting enclave.

Stage 5: Calling hardware instructions to get a report key and verifying the report using the report key. Creating a structure signed by an enclave, using a key verifiable by an attestation service.

Stage 6: Receiving and/or generating a quote produced and signed by a quoting enclave.

Stage 7: Validating a signature of the quote produced using a public key certificate to validate the signature.

The remote attestation process of step 812 may provide verification for the platform identity, certifying the digital media is unmodified, and that the digital media will be running securely within an enclave on an enabled platform. Attestation would then make remote access secure, allowing DRM management in multiple platforms but using platform-based cryptography to manage or restrict content in the enabled platform.

When the attestation is verified in step 812, platform 100 may continue to step 814 and perform sealing of binary files with keys using the sealing enclave. For example, platform 100 may seal the binary files to a specific enclave or to a specific author using EGETKEY SGX instructions. In step 816, platform 100 may install the sealed binary, completing a provisioning of the platform using remote attestation verification to enhance security and safety of digital content.

If in step 804, platform 100 determines that the platform has been provisioned (step 804: Yes), platform 100 may skip steps 806-816 and continue to step 818. In some embodiments, after installing a sealed binary in the platform, platform 100 may also continue to step 818.

In step 818, platform 100 may load the sealed binary in a secure boot enclave with the UEFI firmware. For example, as discussed in connection with FIG. 3, platform 100 may use UEFI loader 306 to load the seal binary for execution. In step 820, platform 100 may use cryptographic entropy within the booting enclave and a local decryption key to decrypt the sealed binary. For example, the sealed binary of step 814 may be loaded into a secure boot enclave with sealed AES key. Further, cryptographic entropy within the enclave may be used with the sealed key to verify each boot module.

In step 822, platform 100 may determine whether the decryption was successful. If platform 100 determines that the decryption was not successful (step 822: No), platform 100 may continue to step 824 and halt the executing operation and will not execute the software or open the digital media in the platform. But if platform 100 determines that the decryption was successful (step 822: Yes), platform 100 may continue to step 826 and execute the binary and/or related digital media in the platform. For example, after installing the sealed binary and before initiating the operating system, platform 100 may load the sealed binary in a second UEFI application, where the second UEFI application may comprise a boot enclave. Further, platform 100 may decrypt the sealed binary file with the second key and cryptographic entropy within the boot enclave and open or execute the digital media when a decryption of the sealed binary file is successful.

In step 828, platform 100 may create new keys with cryptographic material within the enclave. For example, platform 100 may use unique cryptographic material within the enclave as a source of entropy to create additional unique keys that can be stored in a virtual MSR that a hypervisor can make available for a VM. In step 830, platform 100 may make the unique keys of step 828 available for the VMs supported by the hypervisor.

Alternatively, and/or additionally, when platform 100 determines that the platform is provisioned (step 804: Yes), platform 100 may perform a streamlined booting operation, including launching a second UEFI application (the second UEFI application comprising a boot enclave), decrypting the sealed binary file with the second key and cryptographic entropy withing the boot enclave, and executing the digital media when a decryption of the sealed binary file is successful.

Process 800 may facilitate the combination of multiple encryption technologies with unique hardware cryptographic material to build a software binary bound to specific hardware at rest and execution. In addition, process 800 may facilitate a unique implementation to extend DRM to virtual machines in a virtualization environment implementing virtual MSR key stores and in provisioning platforms with specific software installations. This combination of techniques and the disclosed sequence of process 800 may prevent software cloning and limit installation and executing of software in specific authorized platforms. Further, process 800 may avoid the requirements of using an authorization server because process 800 may provide a verification option that is self-contained and would allow for secure provisioning of software on customer platforms without the need of additional servers or hardware for each OEM or external platforms.

Figure 9:
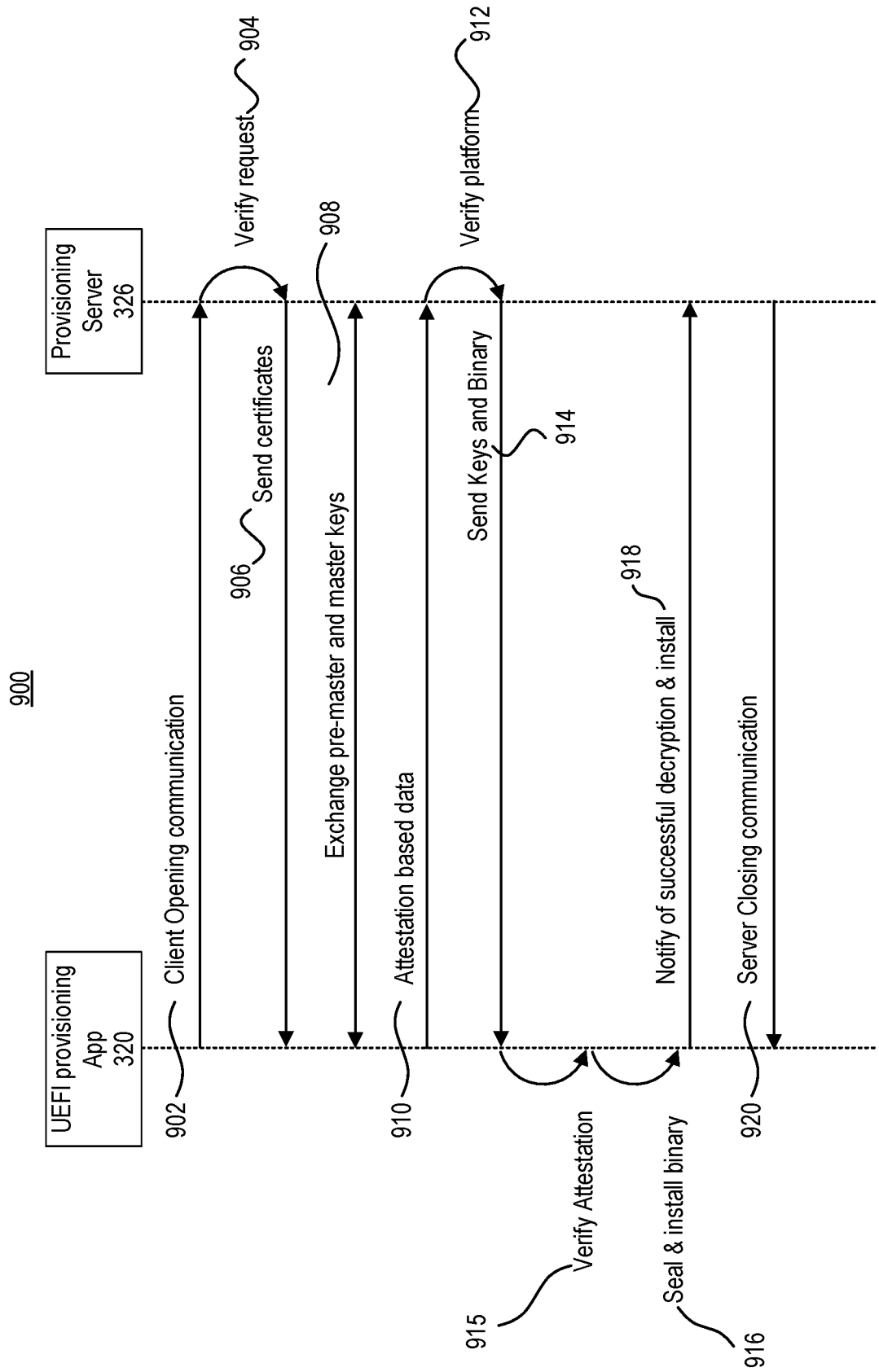
FIG. 9 is a timing diagram of a process for communication between a processor and an attestation server, consistent with disclosed embodiments.

FIG. 9 is a timing diagram of a process 900 for communication between a processor and an attestation server, consistent with disclosed embodiments. As shown in FIG. 9, different elements of block diagram 300 may perform process 900. For example, UEFI provisioning application 320 may perform some steps of process 900, while provisioning server 326 may perform other step of process 900. In other embodiments, however, platform 100 may perform steps of process 900. For example, processor 102 (FIG. 2) may perform steps of process 900.

In step 902, UEFI provisioning application 320 may send a client opening communication to provisioning server 326. For example, UEFI provisioning application 320 may send a request to initiate TLS communication. In step 904, provisioning server 326 may verify the request.

In step 908, UEFI provisioning application 320 and provisioning server 326 may exchange pre master and master keys. For example, UEFI provisioning application 320 and provisioning server 326 may perform a key exchange (e.g., using Diffie-Hellman) and derive master keys.

In step 910, UEFI provisioning application 320 may provide attestation data. For example, as discussed in connection with FIG. 8, an attestation enclave in UEFI provisioning application 320 may provide attestation data to provisioning server 326. In step 912, provisioning server 326 may verify the platform and, upon successful verification, provisioning server 326 may send keys and binary files to UEFI provisioning application 320 in step 914.

In step 915, UEFI provisioning application 320 may verify attestation of information exchanged from and to provisioning server 326. In step 916, UEFI provisioning application 320 may seal and install binary in the platform. For example, UEFI provisioning application 320 may communicate with a CPU to install seal and install binary files with the operations discussed in connection with FIG. 6. In step 918, UEFI provisioning application may notify provisioning server 326 of successful decryption and installation. In step 920, provisioning server 326 may transmit a sever closing communication, terminating, for example, the TLS communication.

Another aspect of the disclosure is directed to a non-transitory computer-readable medium storing instructions that, when executed, may cause one or more processors to perform the methods, as discussed above. The computer-readable medium may include volatile or non-volatile, magnetic, semiconductor, tape, optical, removable, non-removable, or other types of computer-readable medium or computer-readable storage devices. For example, the computer-readable medium may be the storage unit or the memory module having the computer instructions stored thereon, as disclosed. In some embodiments, the computer-readable medium may be a disc or a flash drive having the computer instructions stored thereon.

It will be apparent to those skilled in the art that various modifications and variations can be made to the disclosed system and related methods. Other embodiments will be apparent to those skilled in the art from consideration of the specification and practice of the disclosed system and related methods. It is intended that the specification and examples be considered as exemplary only, with a true scope being indicated by the following claims and their equivalents.

While the present disclosure has been shown and described with reference to particular embodiments thereof, it will be understood that the present disclosure can be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. Various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

Thus, the foregoing description has been presented for purposes of illustration only. It is not exhaustive and is not limiting to the precise forms or embodiments disclosed. Modifications and adaptations will be apparent to those skilled in the art from consideration of the specification and practice of the disclosed embodiments.

The claims are to be interpreted broadly based on the language employed in the claims and not limited to examples described in the present specification, which examples are to be construed as non-exclusive. Further, the steps of the disclosed methods may be modified in any manner, including by reordering steps and/or inserting or deleting steps.

What is claimed is:

1. A system for digital rights management, comprising:
at least one processor in a platform; and
at least one memory device including instructions that when executed configure the at least one processor to perform operations, the operations comprising:
before initiating an operating system of the at least one processor, determining whether a digital media is locally installed in a platform;
in response to determining that the digital media is not locally installed, launching a first Unified Extensible Firmware Interface (UEFI) application configured to generate attestation data in an attestation enclave and communicate attestation based data to a server through an encrypted medium;
receiving, from the server and through the encrypted medium, a binary file of the digital media and a first decryption key;
performing a sealing of the binary file using a sealing enclave of the first UEFI application and generating a local decryption second key based on the first key and local entropy, the second key being unique to the platform; and
installing the sealed binary file on local storage of the platform,
wherein:
the digital media comprises a hypervisor configured to launch virtual machines with segregated resources of the at least one processor;
the first UEFI application is further configured to: generate a plurality of third keys using unique on-die cryptographic unique material and store the plurality of third keys in a mode specific register of the platform; and
the operations further comprise validating virtual machines on the hypervisor using at least one of the plurality of third keys.

2. The system of claim 1, wherein the operations further comprise:
after installing the sealed binary and before initiating the operating system, loading the sealed binary in a second UEFI application, the second UEFI application comprising a boot enclave;
decrypting the sealed binary file with the second key and cryptographic entropy withing the boot enclave; and
opening or executing the digital media when a decryption of the sealed binary file is successful.

3. The system of claim 2, wherein:
the encrypted medium comprises a Transport Layer Security (TLS) encrypted channel;
the first key comprises a Rivest-Shamir-Adleman (RSA) public key; and
the second key comprises a symmetric private key.

4. The system of claim 1, wherein receiving the binary file comprises verifying attestation of the binary file within the attestation enclave.

5. The system of claim 1, wherein the operations further comprise:

in response to determining the digital media is locally installed, launching a second UEFI application, the second UEFI application comprising a boot enclave;
decrypting the sealed binary file with the second key and cryptographic entropy withing the boot enclave; and
executing the digital media when a decryption of the sealed binary file is successful.

6. The system of claim 1, wherein:
the digital media is an update recovery script; and
the operations further comprise retrieving recovery instructions after decrypting the sealed binary file using the second UEFI application.

7. A method for digital rights management comprising:
before initiating an operating system of a processor in a platform, determining whether a digital media is locally installed in the platform;
in response to determining that the digital media is not locally installed, launching a first UEFI application configured to generate attestation data in an attestation enclave and communicate attestation based data to a server through an encrypted medium;
receiving, from the server and through the encrypted medium, a binary file of the digital media and a first decryption key;
performing a sealing of the binary file using a sealing enclave of the first UEFI application and generating a local decryption second key based on the first key and local entropy, the second key being unique to the platform; and
installing the sealed binary file on local storage of the platform,
wherein:
the digital media comprises a hypervisor configured to launch virtual machines with segregated resources of the at least one processor;
the first UEFI application is further configured to generate a plurality of third keys using unique on-die cryptographic unique material and store the plurality of third keys in a mode specific register of the platform; and
the method further comprises validating virtual machines on the hypervisor using at least one of the plurality of third keys.

8. The method of claim 7, further comprising:
after installing the sealed binary and before initiating the operating system, loading the sealed binary in a second UEFI application, the second UEFI application comprising a boot enclave;
decrypting the sealed binary file with the second key and cryptographic entropy withing the boot enclave; and
opening or executing the digital media when a decryption of the sealed binary file is successful.

9. The method of claim 8, wherein:
the encrypted medium comprises a Transport Layer Security (TLS) encrypted channel;
the first key comprises a Rivest-Shamir-Adleman (RSA) public key;
the second key comprises a symmetric private key; and
receiving the binary file comprises verifying attestation of the binary file within the attestation enclave.

10. The method of claim 7, further comprising:
in response to determining that the digital media is locally installed, launching a second UEFI application, the second UEFI application comprising a boot enclave;
decrypting the sealed binary file with the second key and cryptographic entropy withing the boot enclave; and
executing the digital media when a decryption of the sealed binary file is successful.

11. The method of claim 7, wherein:
the digital media is an update recovery script; and
the method further comprises retrieving recovery instructions after decrypting the sealed binary file using the second UEFI application.

12. An apparatus, comprising:
one or more processors; and
one or more memory devices comprising instructions that configure the one or more processors to:
before initiating an operating system of the apparatus, determine whether a digital media is locally installed in the apparatus;
in response to determining that the digital media is not locally installed, launch a first UEFI application configured to generate attestation data in an attestation enclave and communicate attestation based data to a server through an encrypted medium;
receive, from the server and through the encrypted medium, a binary file of the digital media and a first decryption key;
perform a sealing of the binary file using a sealing enclave of the first UEFI application and generating a local decryption second key based on the first key and local entropy, the second key being unique to the platform; and
install the sealed binary file on local storage of the platform,
wherein:
the digital media comprises a hypervisor configured to launch virtual machines with segregated resources of the at least one processor; and
the first UEFI application is further configured to:
generate a plurality of third keys using unique on-die cryptographic unique material; and
store the plurality of third keys in a mode specific register of the platform; and
the instructions further configure the one or more processors to validate virtual machines on the hypervisor using at least one of the plurality of third keys.

13. The apparatus of claim 12, wherein the instructions further configure the one or more processors to:
after installing the sealed binary and before initiating the operating system, load the sealed binary in a second UEFI application, the second UEFI application comprising a boot enclave;
decrypt the sealed binary file with the second key and cryptographic entropy withing the boot enclave; and
open or execute the digital media when a decryption of the sealed binary file is successful.

14. The apparatus of claim 12, wherein:
the encrypted medium comprises a Transport Layer Security (TLS) encrypted channel;
the first key comprises a Rivest-Shamir-Adleman (RSA) public key;
the second key comprises a symmetric private key; and
receiving the binary file comprises verifying attestation of the binary file within the attestation enclave.

15. The apparatus of 12, wherein the instructions further configure the one or more processors:
in response to determining the digital media is locally installed, launch a second UEFI application, the second UEFI application comprising a boot enclave;
decrypt the sealed binary file with the second key and cryptographic entropy withing the boot enclave; and
execute the digital media when a decryption of the sealed binary file is successful.

16. The apparatus of claim 12, wherein:

the digital media is an update recovery script; and the instructions further configure the one or more processors to retrieve recovery instructions after decrypting the sealed binary file using the second UEFI application.

* * * * *